C. HAINES.
Stump Extractor.
No. 202,107. Patented April 9, 1878.
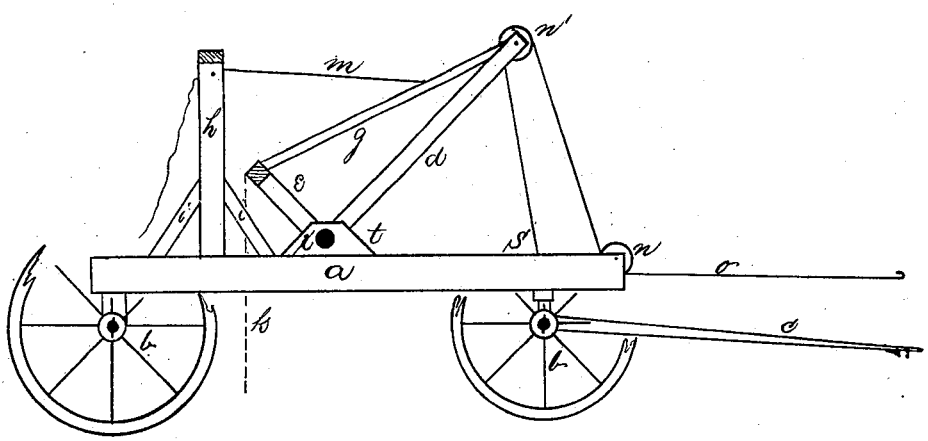

UNITED STATES PATENT OFFICE.

CHARLES HAINES, OF MANCHESTER, MAINE.

IMPROVEMENT IN STUMP-EXTRACTORS.

Specification forming part of Letters Patent No. 202,107, dated April 9, 1878; application filed November 2, 1877.

*To all whom it may concern:*

Be it known that I, CHARLES HAINES, of Manchester, in the county of Kennebec and State of Maine, have invented a new and useful Improvement in Stump and Rock Extractors, which improvement is fully set forth in the following specification and accompanying drawing, which is an outline drawing of my invention as used.

The object of my invention is to construct a stump and rock extractor that may be used to lift ordinary stones and stumps, and to carry them to any desired place without the trouble of reloading them.

In the drawing, $a$ is the body of a long wagon, supported on the wheels $b\ b$, the hind wheels being placed at the extreme end, to allow of the stump or rock being raised between the wheels without interfering with them, and, as an additional precaution, the sides of the wagon are spread apart at the back, the hind axle being made longer.

$c$ is the tongue for hauling the whole device. Upon each of the sides are fixed boxes, one shown at $t$, through which runs the trunnion $x$, which is the fulcrum of the levers used. To this trunnion the long lever $d$ and the short lever $e$ are fixed. The levers are connected and supported by the rod or brace $g$ to the short lever $e$.

The chain K, for lifting the stump or rock, is attached as shown. This chain may be continued over the short lever $e$ and attached to the long lever $d$, and thus serve as a substitute for the rod or brace $g$.

The rope $o$ is connected to the body at S, thence passes up over the pulley $u'$, thence down under the pulley $u$, and to the team or power used for hoisting.

$h$ is an upright frame, supported, if necessary, by braces $i\ i$. The object of this frame is to hold the hoisting apparatus up when desired.

The rope $m$ is connected to the rod or brace $g$, passes over the upright $h$, and is used to bring the levers to place for hoisting.

To operate the extractor, the levers are brought to the desired position, and the chain K attached to the object to be lifted. The team is attached to the rope $o$, and the long lever $d$ drawn down. This, of course, raises the short lever $e$, and the object is lifted thereby. If the object is not raised to a sufficient height at first, it may be stayed up, another hold taken, and so on until the desired height is obtained.

The device, it is evident, may be used either with the pulleys, as indicated, or with the ordinary tackle and fall, the pulleys being increased where more power is needed.

The great advantage which I claim for this extractor is the fact that almost unlimited power may be obtained by bringing the long lever down to nearly a level before it is required to lift, the distance between the perpendicular of the chain K and the trunnion $x$ representing the short purchase. From this fact it will be seen that great power can be exerted to start the stump or rock; then, by putting the long lever to a perpendicular, or nearly so, and attaching the chain K, the rock or stump can be raised to any desired height. This is the chief merit of my device, and one which I claim distinguishes it from all others.

I claim as my invention—

1. A stump and rock extractor composed of the body $a$, having the upright $h$ and box $t$ thereon, in combination with the chain K, levers $e$ and $d$, connected by rod $g$, all operated by rope $o$ and pulleys $u'\ u$, in substance as set forth and specified.

2. The combination of the body $a$, box $t$, trunnion $x$, levers $e$ and $d$, brace or rod $g$, upright $h$, ropes $m$ and $o$, and pulleys $u$ and $u'$, for the purposes set forth, specified, and described.

CHARLES HAINES.

Witnesses:
    EUGENE S. FOGG,
    W. S. CHOATE.